No. 781,866. PATENTED FEB. 7, 1905.
W. K. AUSTIN.
TRANSMITTING DEVICE.
APPLICATION FILED OCT. 3, 1903.
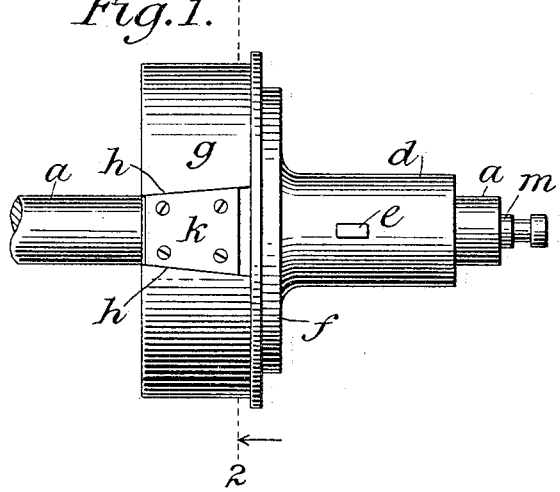
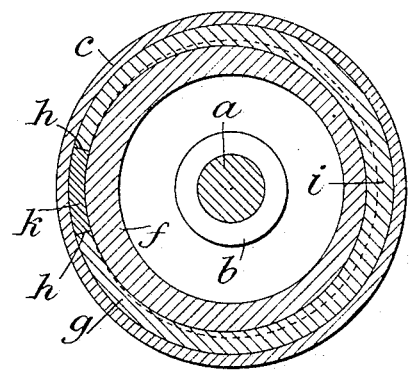
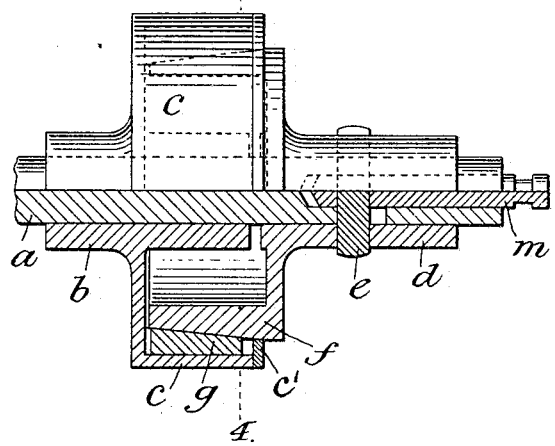
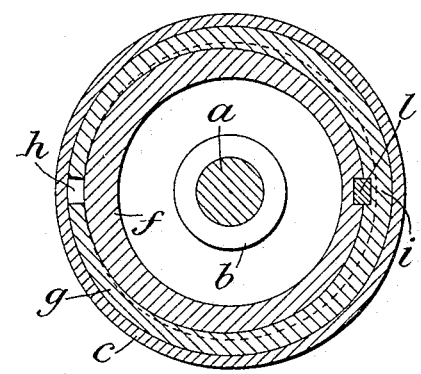
Witnesses:
A. N. Jesbera
Martin Roberts
Inventor:
William K. Austin
By Redding, Kiddle & Greeley
Attys.

No. 781,866.

Patented February 7, 1905.

UNITED STATES PATENT OFFICE.

WILLIAM K. AUSTIN, OF NEW YORK, N. Y.

TRANSMITTING DEVICE.

SPECIFICATION forming part of Letters Patent No. 781,866, dated February 7, 1905.

Application filed October 3, 1903. Serial No. 175,637.

*To all whom it may concern:*

Be it known that I, WILLIAM K. AUSTIN, a citizen of the United States, residing in the borough of Brooklyn, city of New York, State of New York, have invented certain new and useful Improvements in Transmitting Devices, &c., of which the following is a specification, reference being had to the accompanying drawings, forming a part hereof.

This invention relates to clutches, brakes, and other devices of like general character by which engagement is effected between two members one of which has or may have movement with respect to the other, and more particularly to devices of this general character in which an expansible ring, usually segmental, is employed to effect the desired engagement. Heretofore in devices of this character the expansible member has not been capable of uniform expansion, and particularly when movable segments are employed the contact between the expansible member and the coöperating member has been limited to an area considerably less than the total area of the working surface of the coöperating member. There is thus considerable wear between the coacting members, and such wear is not uniform at all points, while the action of such devices is unsatisfactory in that it is pratically impossible to regulate to a nicety the frictional engagement of the coacting parts and it is impossible to control perfectly the braking or clutching action.

It is the object of the present invention to overcome the defects in the prior devices, some of which are here alluded to, and to provide a device in which the engagement of the coacting parts shall be uniform at all points and capable of perfect control. To this end there is provided a member which shall be uniformly expansible or contractible and a structure in which the advantages of such uniformly expansible or contractible member can be realized fully. In accomplishing this result the variable member is formed as a split ring, preferably of varying thickness, such ring being preferably thinnest at its ends and thickest in a line diametrically opposite the split or line of division. However, whether this variable member be of varying thickness or of uniform thickness it is mounted upon a conical head or it may be within a conical sleeve or shell if the variable member is intended to contract upon the driven part, so that in either case the variable member is supported or backed up in its expansion or contraction by such conical head or conical sleeve. Furthermore, the force by which the variable member is expanded or contracted is preferably, although not necessarily, applied tangentially at the ends of the split ring which constitutes the variable member, the conical supporting member in this case following up the ring as it is expanded or contracted by the wedge-like action of a device moving longitudinally with respect to the variable member.

It will be obvious that the improvement may be applied in a clutch or a brake or other device of like character; but for the purpose of illustrating and explaining the nature of the invention it is shown in the accompanying drawings and is described hereinafter as applied in a clutch.

In the drawings, Figure 1 is a view in elevation of a device embodying the invention, the outer shell, which in the embodiment illustrated may be termed the "driven" member, being removed to show the variable member. Fig. 2 is a view in transverse section on the plane indicated by the broken line 2 2 of Fig. 1. Fig. 3 is a view, partly in elevation and partly in longitudinal central section, with the outer shell or driven member in position. Fig. 4 is a view in transverse section on the plane indicated by the broken line 4 4 of Fig. 3, showing also a slight modification to be referred to hereinafter.

It will be obvious that the operation of the improved device is the same in character whether it be embodied in a clutch, as illustrated herein, or in a brake and that the varible member, which is herein shown as an expansible ring, is interposed between the two members of the device, which for convenience herein will be referred to as the "driving" member and the "driven" member, respectively, although in the case of a brake one of such members would be stationary, it being necessary simply that there should be relative movement or capacity for relative movement between the two members, so that one member shall be driven from the other or shall be brought into the same state of rest as the other. It will also be obvious that in a clutch either member might be the driver and the other the driven part, although for convenience one particular member is herein designated as the "driver" or "driving" member and the other as the "driven" part or member.

In the structure shown in the drawings there is a central shaft or spindle or axle $a$, upon which is mounted to turn freely a hub or sleeve $b$, which represents the driven member, said sleeve having, preferably, integral therewith a shell $c$, which is concentric, at least as to its inner periphery, with the driven member $b$ and the shaft $a$. The shell $c$ may be made to constitute a driving-pulley, if desired, or power may otherwise be taken from the driven member. Obviously the driving power may be transmitted through the shaft $a$ or directly through the part herein designated as the driver or driving member, which is shown as a sleeve $d$, mounted upon the shaft $a$ and in this case secured thereto to rotate therewith, as by a pin $e$. The sleeve $d$ has secured thereto in any suitable manner or formed integral therewith a supporting-head $f$, which may be hollow for convenience, but externally is preferably eccentric with respect to the axis of both the driving and the driven members, such members themselves being concentric, as usual. The supporting-head $f$ is also tapered longitudinally, as clearly shown in Fig. 3, and coöperates with the variable member $g$, which is shown as an expansible divided ring coöperating directly with the exterior surface of the cone or conical head $f$ and the interior surface of the shell $c$. This ring is divided or split, as at $h$, and is preferably of varying thickness, being thinnest at its edges adjacent to the line of division and thickest at the diametrically opposite line, as at $i$. Internally the ring may be circular and concentric with the axis of the driving and driven members; but externally it is preferably eccentric with respect to such axis, the eccentricity of the variable member or expansible ring being opposite that of the supporting-head $f$, so that the major eccentricity or thickness of the ring corresponds with the minor eccentricity of the conical eccentric head $f$. The variable ring or expansible member $g$ is also tapered internally to conform to the external taper of the conical head $f$. The proper relation between the variable member and the supporting-head is maintained by any suitable means— such, for example, as the tapering wedge-shaped stop $k$, secured to the conical head, as shown in Fig. 1—the abutting edges of the variable member or expansible ring $g$ being tapered to conform to the tapering stop or a spline $l$ between the conical head and the expansible ring, as shown in Fig. 4, either construction permitting relative longitudinal movement between the conical head and the ring and preventing relative rotation.

For the purpose of effecting the expansion of the ring $g$ to effect or increase the frictional engagement between such ring and the shell $c$ of the driven member the supporting-head $f$ should be capable of longitudinal movement. Any suitable means may be employed to effect such longitudinal movement, and in the arrangement shown in the drawings a rod or spindle $m$ is located centrally within an axial bore of the shaft $a$ and is engaged by the pin $e$, above referred to, the walls of the shaft $a$ being slotted longitudinally to permit the necessary movement of the pin $e$. The rod or spindle $m$ may be slotted circumferentially, as shown in Figs. 1 and 2, for engagement by the actuating means employed, such as a forked lever. (Not shown.) The variable member or expansible ring $g$, of uniformly-varying thickness from its thickest portion $i$ to its ends, when expanded by the action of the conical head $f$, will always as to its exterior surface remain circular and concentric with the axis of the shaft at all stages of its expansion. Accordingly the frictional engagement between its exterior surface and the interior surface of the shell $c$ will be uniform at all points, wear between the coacting parts will also be uniform at all points, and the frictional engagement between the coacting parts can be regulated exactly, so that the device, whether employed as a clutch or as a brake, shall be always under perfect control. The speed of the driven part may thus be regulated exactly as desired and the load upon the machine to which the device is applied may be taken up or dropped gradually without any shock or undue strain.

The variable member $g$ may be expanded or contracted into contact with the cylindrical coöperating member simply by longitudinal movement of the conical supporting-head $f$ with respect to the variable member, as already indicated, in which case the provision of a straight spline $l$ for maintaining the proper relationship between the parts is sufficient; but it is preferable, as already indicated, to control the action of the variable member, at least in part, by the tangential application of force at the ends thereof. This is accomplished in the construction shown in Figs. 1 and 2 by the wedge $k$, which is secured to the supporting-head and moved therewith between the ends of the split ring. The action of this wedge is to expand the ring against the cylindrical coöperating member, and the wedge may be so placed upon the supporting-head that this action of the wedge shall slightly precede the action of the conical supporting-head, so that the principal function of the supporting-head in this case is to completely fill and support the variable member at all points as it is expanded. The employment of the wedge in this manner prevents the sticking of the parts which might otherwise occur and would have to be overcome when the parts are disengaged.

As will be observed by reference to the drawings, the outer shell or member $c$ is arranged to fit closely about the head or member $f$, as by being provided with a diaphragm $c'$, while the head is cylindrical for a portion of the length corresponding to the extent of longitudinal movement, so that the two members constitute a casing for the working parts which has no opening for any operating devices and is oil-tight and dust-proof. The working surfaces of the device are therefore uniformly lubricated and free from foreign particles at all times, with the result that the device is reliable and certain in operation, while the degree of engagement of the working surfaces is capable of determination to a nicety.

It will be obvious that the improvement may be embodied in different forms and applied in different ways as the requirement of various uses may dictate and that the invention therefore is not to be limited to the particular arrangement and construction shown and described herein.

I claim as my invention—

1. A device of the character described, comprising a divided ring of uniformly-varying thickness, a circular member coacting with one surface of said ring, a supporting-head for said ring movable longitudinally with respect thereto, and a wedge fixed upon said head and movable therewith between the ends of said ring.

2. A device of the character described, comprising a divided ring of uniformly-varying thickness, a circular member inclosing said ring and coacting with the surface thereof, a supporting-head for said ring movable longitudinally with respect thereto, and a wedge fixed upon said head and movable therewith between the ends of said ring, said circular member and said head fitting closely and forming a tight casing about the working parts.

3. A device of the character described, comprising a divided ring of uniformly-varying thickness and tapering longitudinally, a circular member coöperating with one surface of said ring, and a longitudinally-movable device coöperating with the other surface of said ring to vary the diameter thereof.

4. A device of the character described, comprising a divided ring of uniformly-varying thickness and tapering internally, a circular member coacting with the exterior surface of said ring and a longitudinally-movable conical head coöperating with the internal surface of said ring to vary the diameter thereof.

5. In a device of the character described, the combination of a divided ring, a concentric coöperating member, a supporting-head, said ring and head being tapered for coöperation, and a wedge carried by said head and movable longitudinally therewith between the ends of said ring.

6. In a device of the character described, the combination of concentric driving and driven members, a concentric circular shell secured to one of the members, an eccentric cone within the shell secured to the other member, and an expansible ring movable longitudinally upon the cone but keyed thereto with its inner periphery eccentric and its outer periphery concentric with said members.

7. In a device of the character described, the combination of concentric driving and driven members, a concentric circular shell secured to one of the members, an eccentric cone within the shell secured to the other member, and a divided ring movable longitudinally upon the cone, said ring being thinnest at the line of division and of increasing thickness as the diametrically opposite point is approached, said ring also being keyed to the cone with its outer periphery concentric with said members.

8. In a device of the character described, the combination of concentric driving and driven members, a concentric circular shell secured to the driven members, an eccentric cone within the shell secured to the driving member, and an expansible divided ring between the shell and the cone movable longitudinally upon the cone, said ring being thinnest at the point of division and of increasing thickness as the diametrically opposite point is approached, said ring being keyed to the cone with its outer periphery concentric with said members.

9. In a device of the character described, the combination of concentric driving and driven members, a concentric circular shell secured to one of the members, an eccentric cone within the shell secured to the other member, and an expansible ring movable longitudinally upon the cone but keyed thereto with its inner periphery of the same eccentricity as that of the cone and its outer periphery concentric with said members.

10. In a device of the character described, the combination of concentric driving and driven members, a concentric circular shell secured to one of the members, an eccentric cone within the shell secured to the other member, an expansible divided ring being thinnest at the point of division and of increasing thickness as the diametrically opposite point is approached, said ring also being arranged upon the cone with its outer periphery concentric with said members, and a wedge between the ends of the ring and secured to the cone.

11. In a device of the character described, the combination of concentric driving and driven members, a concentric circular shell secured to one of the members, an eccentric cone within the shell secured to the other member and an expansible longitudinally-tapering ring movable longitudinally upon the cone but keyed thereto with its inner periphery eccentric and its outer periphery concentric with said members.

12. In a device of the character described, the combination of concentric driving and driven members, a concentric circular shell secured to one of the members, an eccentric cone within the shell secured to the other member, an expansible ring movable longitudinally upon the cone but keyed thereto with its inner periphery eccentric and its outer periphery concentric with respect to said members, and means to move the cone longitudinally to cause the expansion and contraction of the ring.

13. In a device of the character described, the combination of a shaft or axle, a sleeve upon said shaft and carrying a concentric circular shell, a second sleeve upon said shaft and carrying an eccentric conic head adapted to lie within said shell, a longitudinally-tapering divided ring between the shell and cone movable longitudinally with the cone but keyed thereto, said ring being thinnest at the point of division and of increasing thickness as the diametrically opposite point is approached, said ring also being rotatively keyed to the cone with its outer periphery concentric with the shaft or axle.

This specification signed and witnessed this 30th day of September, A. D. 1903.

WILLIAM K. AUSTIN.

In presence of—
Wm. H. Kellock,
C. S. Barrie.